United States Patent [19]

Naul

[11] 4,094,107

[45] June 13, 1978

[54] FEED MECHANISM FOR USE IN A CENTERLESS GRINDING MACHINE

[75] Inventor: Frederick Henry Naul, Coventry, England

[73] Assignee: TRW Valves Limited, Bilston, England

[21] Appl. No.: 759,275

[22] Filed: Jan. 14, 1977

[30] Foreign Application Priority Data

Jan. 14, 1976 United Kingdom ............... 1284/76

[51] Int. Cl.² ............................................. B24B 47/20
[52] U.S. Cl. ............................. 51/215 CP; 214/1 BB; 198/654; 51/103 WH
[58] Field of Search ...... 51/103 WH, 215 CP, 215 H, 51/215 UE; 214/113 B; 198/621, 654

[56] References Cited

U.S. PATENT DOCUMENTS

| | | | |
|---|---|---|---|
| 2,518,375 | 8/1950 | Richards | 51/215 H |
| 2,911,763 | 11/1959 | Todd | 51/215 UE X |
| 3,767,063 | 10/1973 | McKiven | 241/1 BB |
| 3,939,992 | 2/1976 | Mikulec | 214/1 BB |

FOREIGN PATENT DOCUMENTS 2,103,120  12/1971  Germany .................... 51/215 H Primary Examiner—Gary L. Smith
Attorney, Agent, or Firm—Staas & Halsey

[57] ABSTRACT

A feed mechanism for feeding a workpiece from a first position to a second position comprises a drive member having a carriage mounted thereon, the assembly of drive member and carriage being reciprocable between the first and second positions. The carriage and the drive member are relatively movable, and the carriage carries a clamping assembly, jaws of which are opened and closed in accordance with such relative movement. The carriage can, however, be locked to the drive member by operation of a locking mechanism. The locking mechanism is rendered inoperative when the feed mechanism is in the first and second positions, so that relative movement between the carriage and the drive member can occur, thereby opening and closing the jaws of the clamp assembly.

12 Claims, 9 Drawing Figures

FEED MECHANISM FOR USE IN A CENTERLESS GRINDING MACHINE

This invention relates to a feed mechanism particularly, though not exclusively, for use in a centreless grinding machine.

According to the present invention, there is provided a feed mechanism for feeding a workpiece from a first position to a second position, comprising a drive member reciprocatable between said first and second positions, a carriage engaged with said drive member and movable relative thereto, locking means for selectively locking said carriage to said drive member for movement therewith, a clamp assembly adapted to grip said workpiece, said clamp assembly being carried by one of said drive member and said carriage, and actuating means adapted to open and close jaws of said clamp assembly in accordance with relative movement between said drive member and said carriage, the arrangement being such that said locking means is rendered inoperative when said drive member is adjacent said first and second positions, thereby permitting relative movement between said drive member and said carriage so as to cause said actuating means to open or close said jaws of said clamp assembly.

Preferably, said actuating means includes a cam and a cam follower arrangement carried by the drive member and the carriage, one of a cam surface and a cam follower of said arrangement being operatively connected to said clamp assembly such that relative movement between said drive member and said carriage in use causes said cam follower to move along said cam surface and thereby open or close said jaws of the clamp assembly.

Desirably, said clamp assembly is carried by said carriage, and said cam surface is provided on the drive member and said cam follower is carried by and operatively connected to one of the jaws of said clamp assembly.

Conveniently, said clamp assembly comprises a pair of opposed jaws which are movable towards and away from each other, and said cam and cam follower arrangement comprises a cam follower operatively connected to each said jaw, and a respective cam surface engaged by each cam follower.

Advantageously, releasing means is provided on said carriage, for rendering said locking means inoperative, which releasing means is arranged to be actuated by engagement of said carriage with a fixed stop adjacent said second position.

An ejector mechanism may be provided for ejecting said workpiece from said clamp assembly when said drive member reaches said second position.

The ejector mechanism preferably includes an ejector member having a chamfered surface and an actuator member adapted to engage said chamfered surface as the drive member reaches said second position so as to move said ejector member to eject said workpiece from the clamp assembly in use. More preferably, the ejector member and the actuator member are carried by the drive member and the carriage, the ejector mechanism being actuated when relative movement occurs between the drive member and the carriage at said second position.

The ejector mechanism may also include at least one gas outlet orifice which is arranged to be directed towards said workpiece when the latter is in said second position, and supply means for selectively supplying gas to the or each outlet orifice when said drive member reaches said second position.

Also according to the present invention there is provided in a centreless grinding machine, a feed arrangement comprising a magazine for storing workpieces to be machined, a feed mechanism as defined in any of the last preceding eight paragraphs, and means for supplying workpieces one by one from said magazine to said feed mechanism at said first position, a workpiece support member of said centreless grinding machine being positioned at said second position for receiving workpieces from said feed mechanism for machining.

Embodiments of the present invention will now be described by way of example, with reference to the accompanying drawings, in which.

Figure 1:
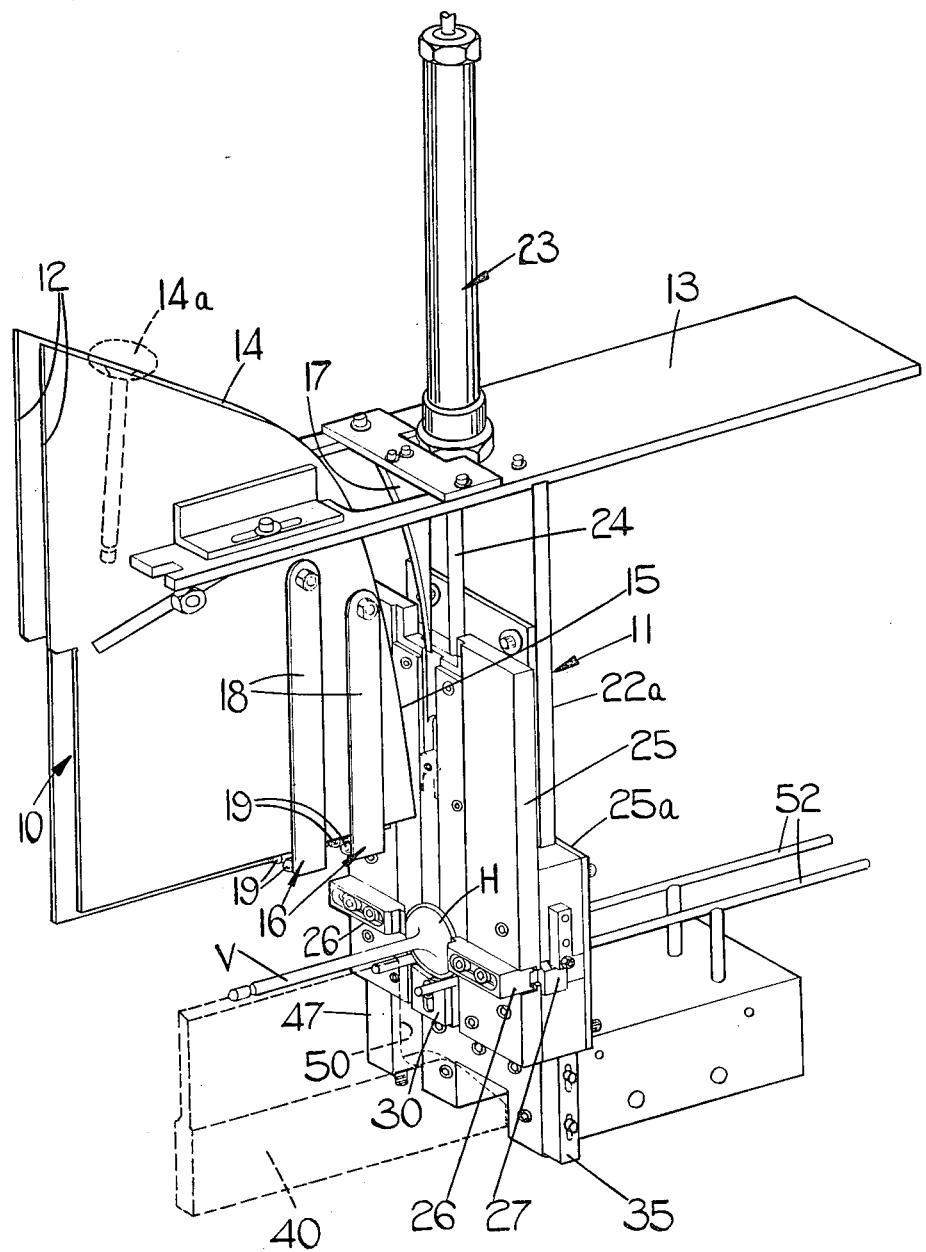
FIG. 1 is a perspective view of part of a centreless grinding machine incorporating one embodiment of a feed mechanism according to the present invention.
Figure 2:
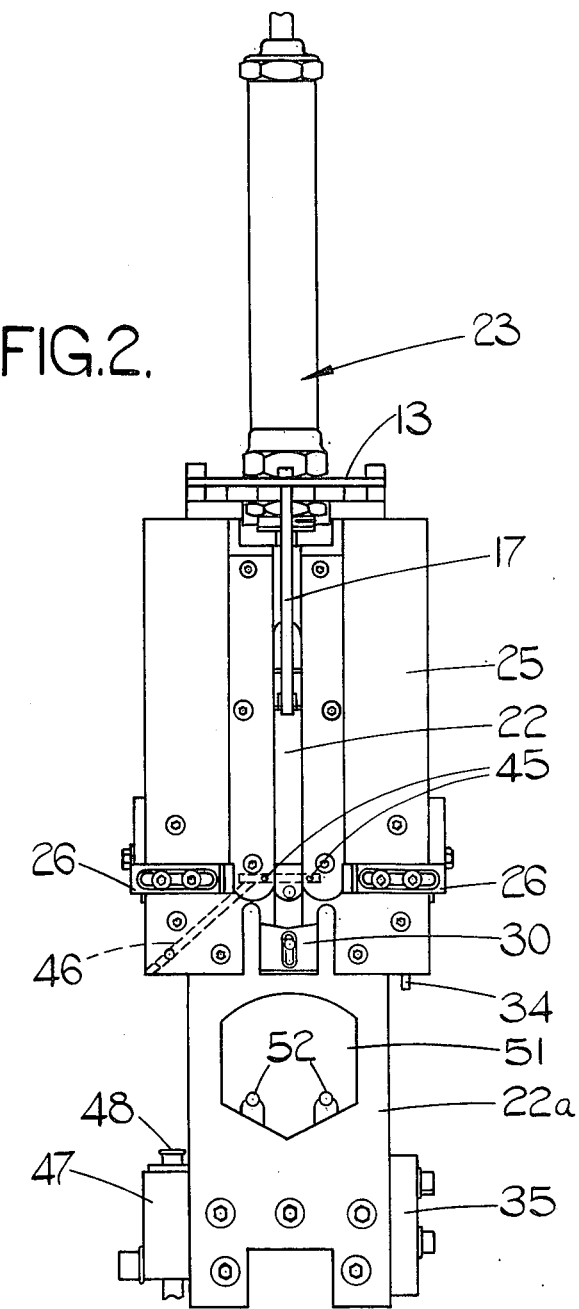
FIG. 2 is a front elevational view of the feed mechanism of FIG. 1.

Referring first to FIG. 1, there is shown therein a first embodiment of a feed arrangement for a centreless grinding machine comprising generally a magazine 10 and a feed mechanism 11. The magazine 10 is of a conventional form, and includes a pair of spaced quadrant plate members 12 mounted on a frame member 13. Workpieces to be machined, in this case internal combustion engine valves, are stored in an upper part 14 of the magazine 10, as indicated by broken lines at 14a. From the drawings, it will be seen that the peripheries of the plate members 12, are generally horizontal at the upper part 14 of the magazine 10 and are generally vertical at the lower part 15 thereof. Thus, the head of the valve is caused to undergo a change in orientation from horizontal to vertical by virtue of its engagement with the peripheries of the plate members 12. Therefore, the stem of the valve which extends perpendicularly from the head, is caused to undergo a change in orientation from generally vertical to generally horizontal. A feeder (not shown) disposed between the plate members 12 feeds the valves one by one to a lower part 15 of the magazine, where they are arrested by arresters 16. A guide 17, fixed to the frame member 13 is provided to ensure that the valves do not fly out of the magazine 10 during their passage to the lower part 15.

The arresters 16 each include a pair of spring arms 18 (only one arm of each pair being visible in FIG. 1) having portions which project below a bottom edge of the magazine 10 and which have abutments 19 thereon. The abutments 19 on each pair of arms 18 are normally juxtaposed so as to hold each valve in turn in a position at the foot of the lower part 15 of the magazine 10. However, when downward pressure is applied to the valve, the spring arms 18 flex apart, thereby creating sufficient clearance between the foot of the lower part 15, the valves are in a position to be received by the feed mechanism 11.

Referring now also to FIGS. 2 to 6, the feed mechanism 11 comprises a drive member 22 which is reciprocatable vertically between upper and lower extreme positions along a guide 22a by means of a piston and cylinder arrangement 23, the drive member 22 being connected to a piston rod 24 of this arrangement. The guide 22a which is in the form of a vertical plate, and the piston and cylinder arrangement 23 are both carried by the frame member 13. A carriage 25 is engaged with the drive member 22 and is movable relative thereto in the direction of movement of the drive member 22. The carriage 25 has portions 25a which engage around edges of the guide 22a. A clamp assembly which is carried by the carriage 25 and includes a pair of opposed jaws 26 which are slidably mounted on the carriage 25 so that they can be moved towards and away from each other in a direction perpendicular to the direction of movement of the drive member 22. Each jaw 26 is adjustably secured to a cam follower 27, so that the spacing of the jaws 26 can be adjusted to suit the workpiece to be machined. Each cam follower 27 consists of a support member 28 and a bearing 29. The jaws are urged into mutual engagement by respective biasing springs (not shown). The carriage 25 is also provided with an adjustable lower support 30 for the workpiece (see FIGS. 1 and 2).

The drive member 22 extend centrally through the carriage 25, and is provided with a pair of opposed cam surfaces 31 thereon. The cam surfaces 31 are each formed by the sides of a V-shaped recess 32 in a respective longitudinal edge of the drive member 22, and are engaged by the bearings 29 of the cam followers 27, respectively. It will be manifest that the bearings 29 are urged into contact with the cam surfaces 31 by the aforementioned biasing springs.

Figure 7:
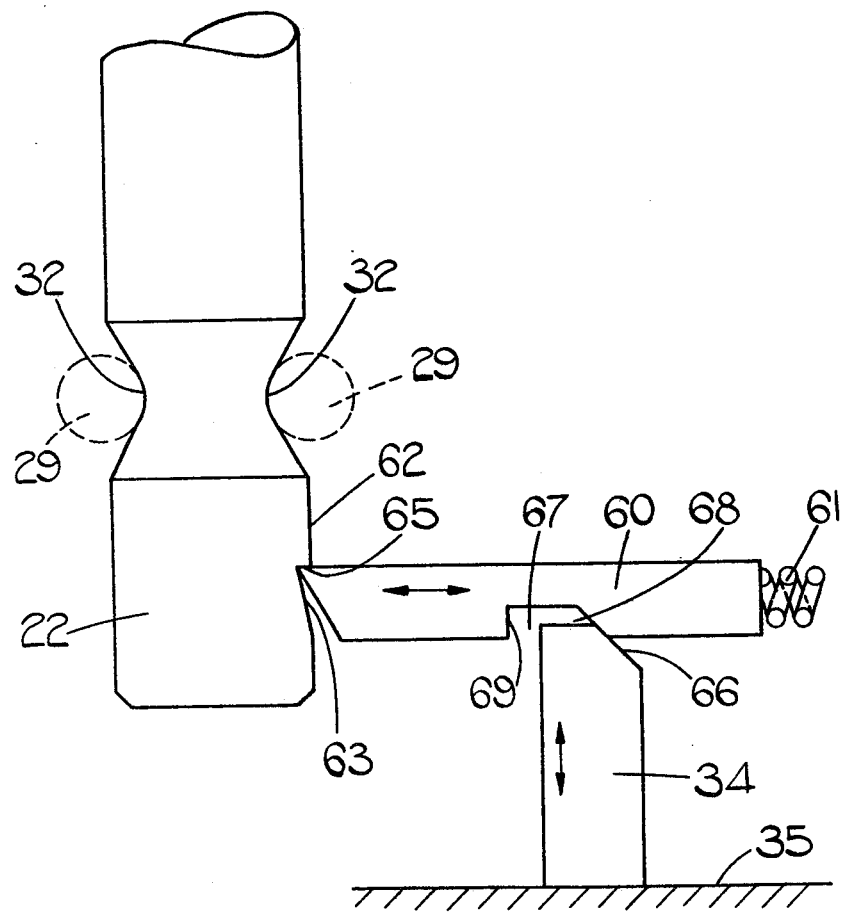
FIG. 7 is a schematic view of locking means of the mechanism of FIGS. 1 to 6.

A locking mechanism, shown schematically in FIG. 7, is provided for selectively locking the carriage 25 against movement relative to the drive member 22. The locking mechanism comprises a locking member 60 slidably carried by the carriage 25 so as to be movable in a direction perpendicular to the direction of movement of drive member 22. The member 60 is biassed by a spring 61 so as to engage an edge 62 of the drive member 22, which edge 62 has a recess 63 therein defining an abutment 65. The locking mechanism is automatically actuated when the bearings 29 of the cam followers 27 reach the bases of the recesses 32 respectively, whereupon an end of the locking member 60 engages the abutment 65 and thereby locks the carriage 25 to the drive member 22 during downward movement of the latter.

A button 34 projects from a lower edge of the carriage 25 (see FIG. 2) and is arranged to engage at one of its ends a fixed, adjustable stop 35 provided at the foot of guide 22a as the drive member 22 approaches its lower extreme position. The other end of buttom 34 has a chamfered surface 66, and is arranged to locate in a recess 67 in the locking member 60. Recess 67 has a chamfered surface 68 and an abutment surface 69. The locking mechanism is released when button 34 is depressed by engagement with the stop 35, wherein the chamfered surfaces 66 and 68 on the button 34 and locking member 60 respectively co-act to move the member 60 to the right, as viewed in FIG. 7, and against the action of spring 61. This causes the end of member 60 to disengage from the abutment 65 on the drive member 22, thereby permitting the drive member 22 to move relative to the carriage 25.

Figure 3:
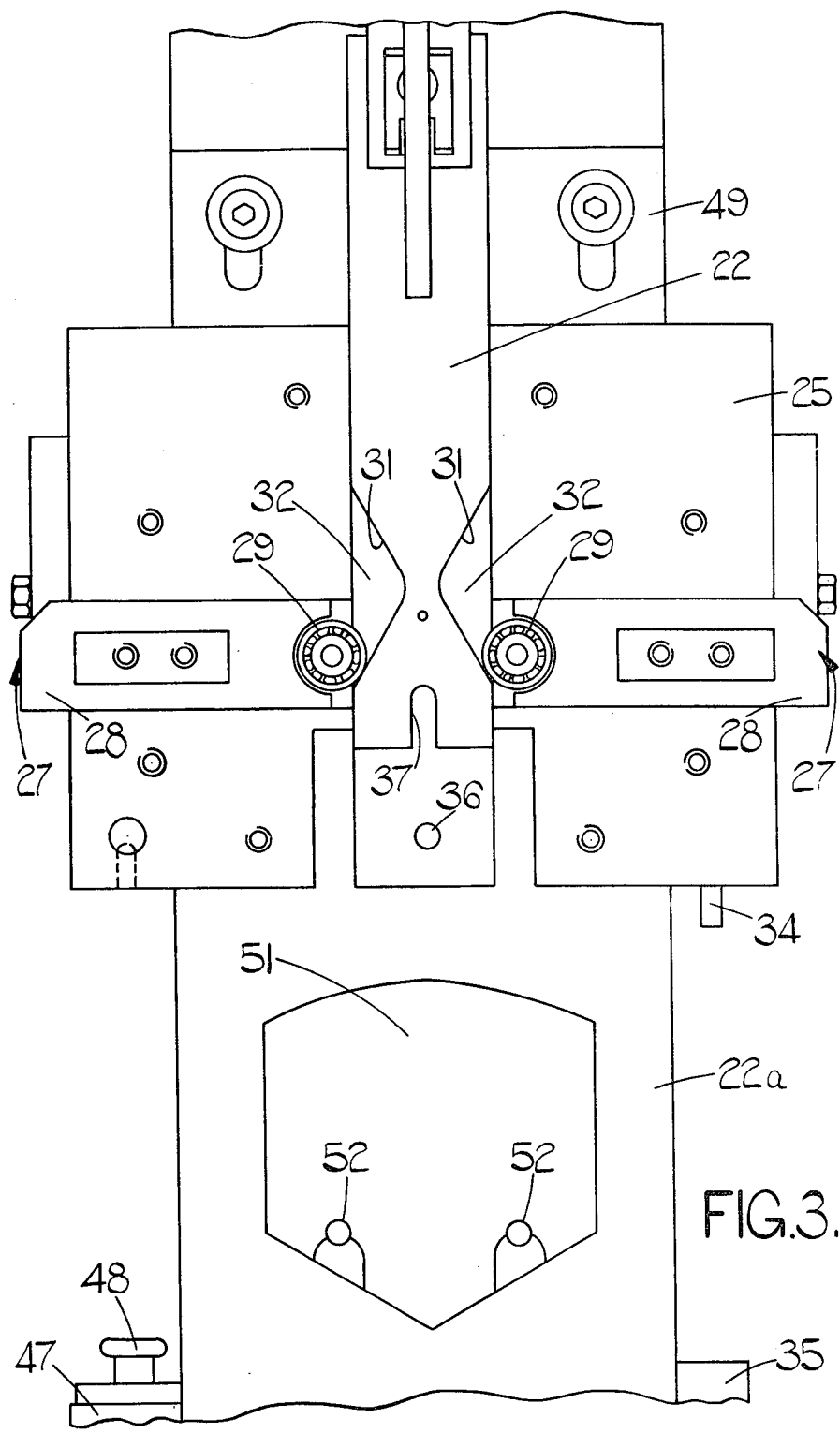
FIGS. 3 to 5 are front elevational views of the feed mechanism of FIGS. 1 and 2, with parts thereof removed for clarity, showing the mechanism in three successive positions.

The operation of the above-described feed mechanism will now be explained, starting from a point where the drive member 22 is in its uppermost extreme position, as shown in FIG. 3. In this position, the said locking mechanism is not actuated, and therefore the carriage 25 and the drive member 22 can be moved relative to one another. The bearings 29 of the cam followers 27 are engaged with the lower sides of the recesses 32, respectively, and the jaws 26 are thus held apart and are positioned on either side of a head H of a valve V held in the lower part 15 of the magazine 10 by the arresters 16.

Figure 4:
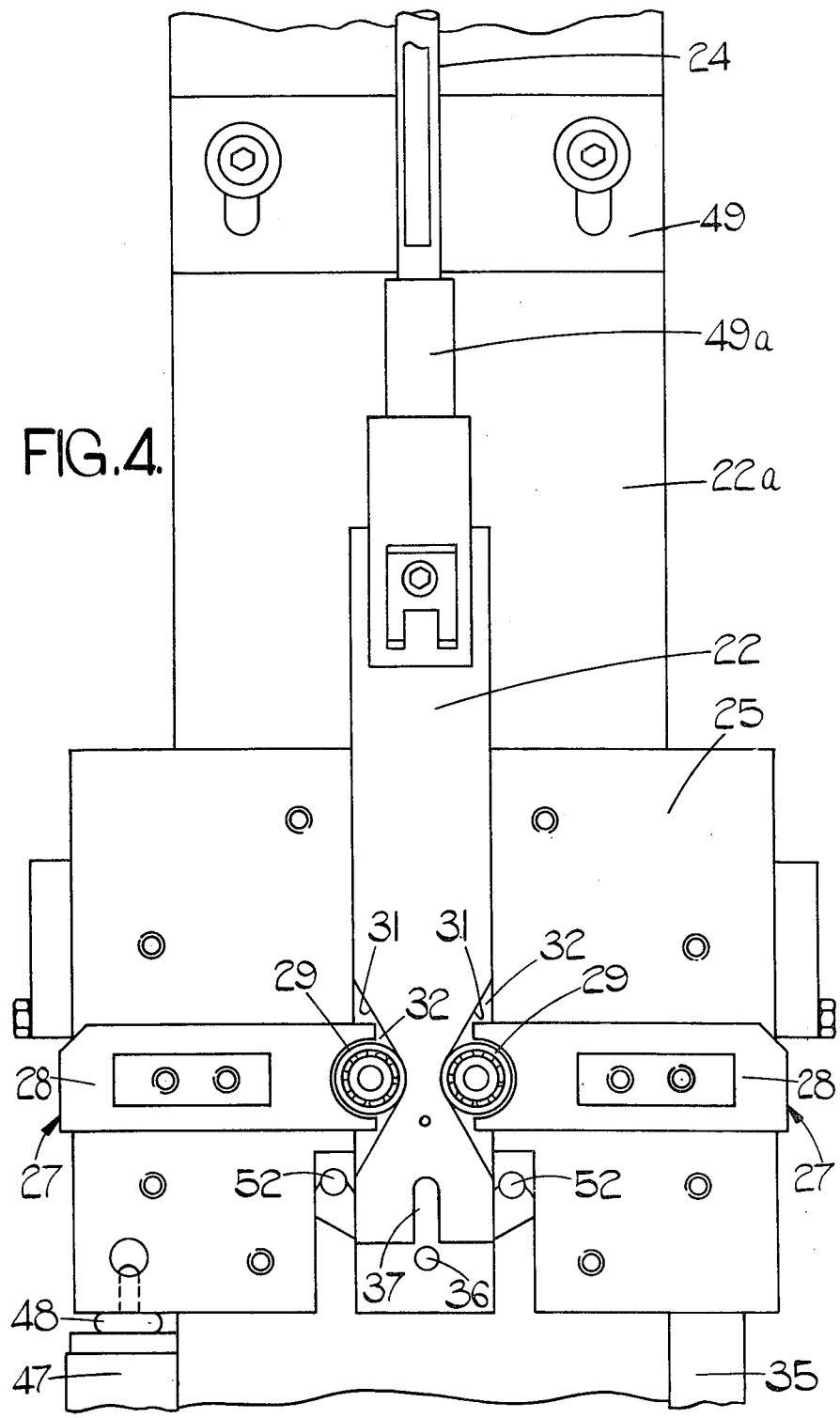
Figure 5:
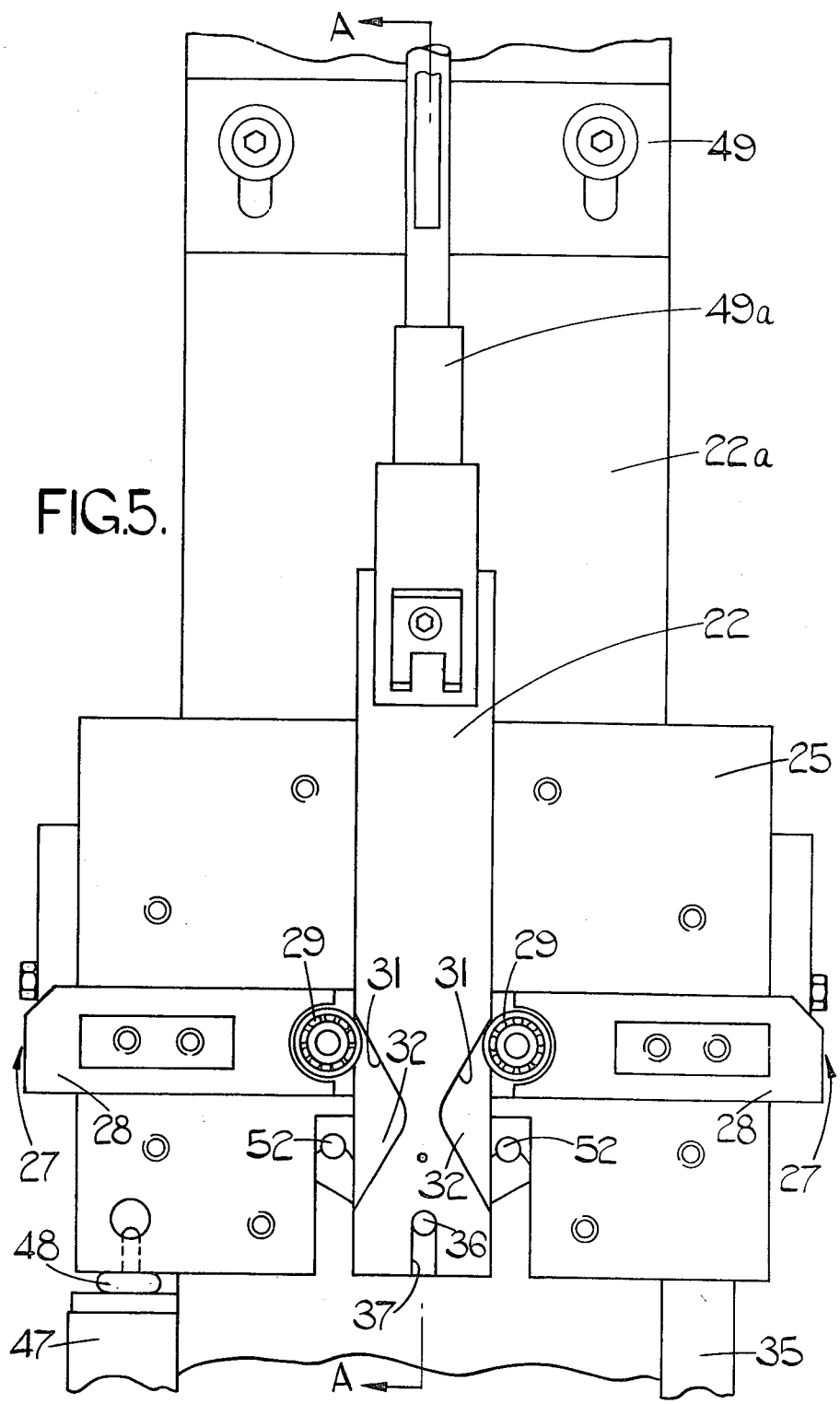

The piston and cylinder arrangement 23 is then pressurized with compressed air so as to move the drive member 22 downwardly. Initially, the carriage 25 is held against movement with the drive member 22, and therefore the drive member 22 moves relative to the carriage 25, causing the bearings 29 of the cam followers 27 to ride along the lower sides of the recesses 32, respectively, to the bases of the latter. The jaws 26 are thereby moved together so as to grip the valve head H therebetween. When the bearings 29 reach the bases of the recesses 32, the aforementioned locking mechanism is actuated so as to lock the carriage 25 to the drive member 22. Continued downward movement of the drive member 22 carries the carriage 25, and therefore the valve V, along with it, until the lower edge of the carriage engages the fixed stop 35, as shown in FIG. 4. As mentioned above, the button 34 is thereby depressed, and the locking mechanism is released enabling the drive member 22 to move relative to the carriage 25 again. Upon further downward movement of the drive member 22, the bearings 29 of the cam followers 27 ride along the upper sides of the recesses 32, respectively, thereby moving the jaws 26 apart and releasing the valve V. Also a stop 36 fixed to the carriage 25 enters a slot 37 in the lower end of the drive member 22. Further downward movement of the drive member 22 is prevented when the stop 36 engages an end of slot 37, and the drive member 22 has then reached its lower extreme position, as shown in FIG. 5.

Figure 6:
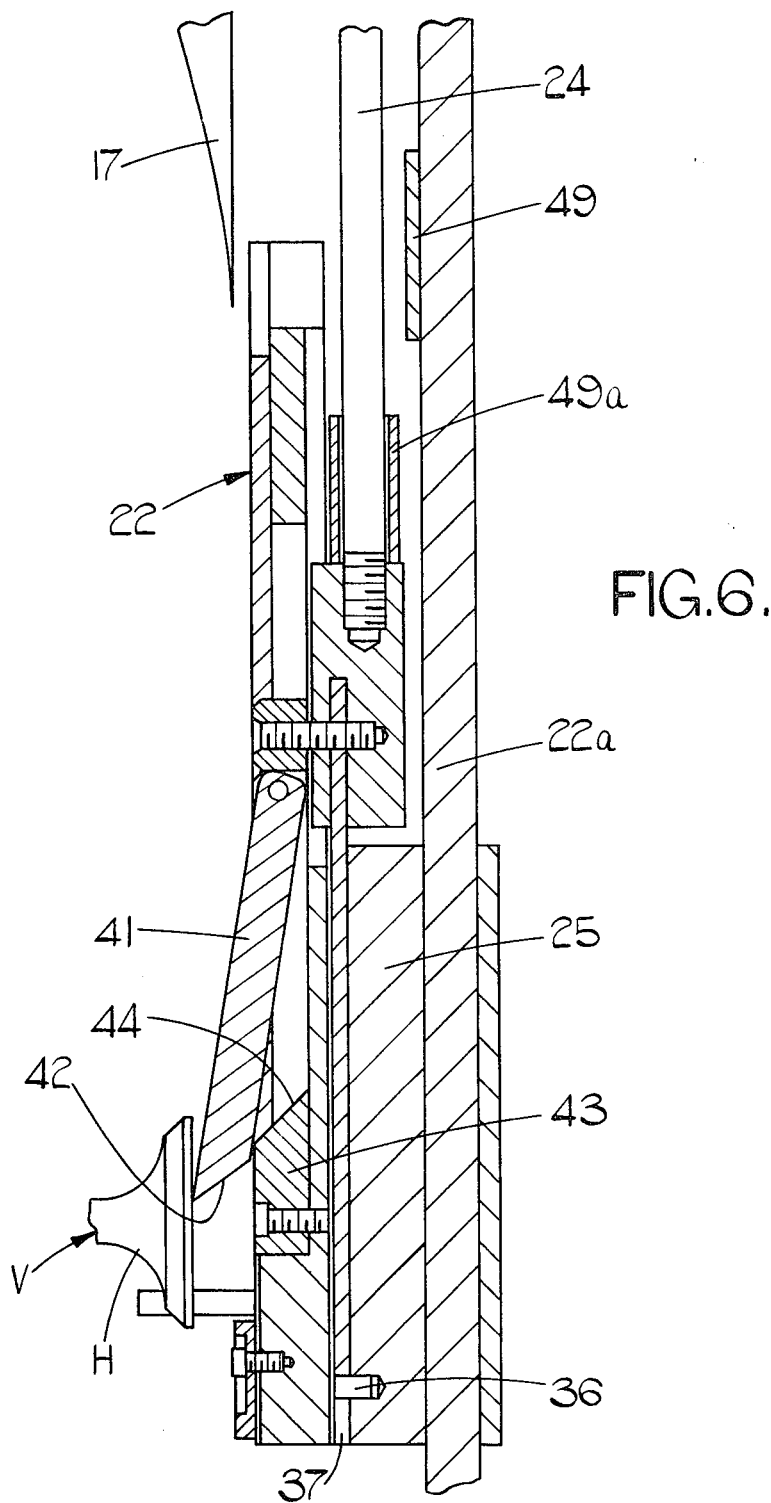
FIG. 6 is a sectional view taken along the line A—A in FIG. 5.

From the above, it will be manifest that the carriage 25 remains stationary during clamping and releasing of the valve. A workpiece support blade 40 (indicated in broken line) of the centreless grinding machine is positioned so as to support the valve V at its point of release from the clamp assembly. An ejector mechanism is provided in the feed mechanism 11 for moving the valve V clear of the jaws 26 of the clamp assembly after the valve has been released thereby. The ejector mechanism is best seen in FIG. 6, and includes an ejector member 41 pivotally mounted at one end thereof on the drive member 22, and having a chamfered surface 42 at its other end. An actuator member 43 having a chamfered surface 44 is carried by the carriage 25 adjacent the jaws 26, and is disposed so that its chamfered surface 44 engages the chamfered surface 42 of the member 41 during the final part of the downward movement of the drive member 22. Engagement of the surfaces 42 and 44 causes the member 41 to pivot and thereby eject the valve V from the clamp assembly. The ejector action is enhanced by air jets produced by passing air through a pair of outlet orifices 45 in the carriage 25. Lubricated air is supplied to the orifices 45 via internal passages 46 in the carriage 25 (see FIG. 2), and this supply of air is controlled by a valve assembly 47 fixed to the foot of the guide 22a. The valve assembly 47 includes an actuating member 48, and is actuated so as to supply air to the orifices 45 when member 48 is depressed by engagement of the lower edge of the carriage 25 therewith. The air also serves to lubricate the internal mechanisms of the carriage 25 and clamp assembly.

Ejection of the valve from the feed mechanisms 10 causes the valve head to come to rest gainst a stop portion 50 of the support blade 40. The valve is then positioned ready for grinding by grinding wheels (not shown) of the centreless grinding machine. After grinding, the valve is ejected through an aperture 51 in the guide 22a (the drive member 22 and carriage 25 having been returned to their initial, upper positions by this time), and onto a pair of rails 52 where the machined valve is stored for collection. The rails 52 extend through the aperture 51, and the drive member 22 is dimensioned so that it can be located therebetween in its lower extreme position. The carriage 25 is slotted so as to provide clearances for the rails 52.

After the valve has been ejected from the feed mechanism 11, the drive member 22 and the carriage 25 are returned to their initial positions, the operation of the feed mechanism 11 during the return movement being the same as that described above, but in reverse. An adjustable stop 49 is provided at the top of guide 22a for arresting the carriage 25, and suitable means is provided for releasing the said locking mechanism to enable the drive member 22 to move relative to the carriage 25 as it approached its upper extreme positions. A sleeve 49a on an end of the piston rod 24 adjacent to drive member 22 acts as a stop for the drive member 22 in its upper extreme position, as can be seen to advantage in FIG. 3. The cycle is recommended with a new valve when the previous valve has been satisfactorily ejected onto the rails 52 after grinding.

Figure 8:
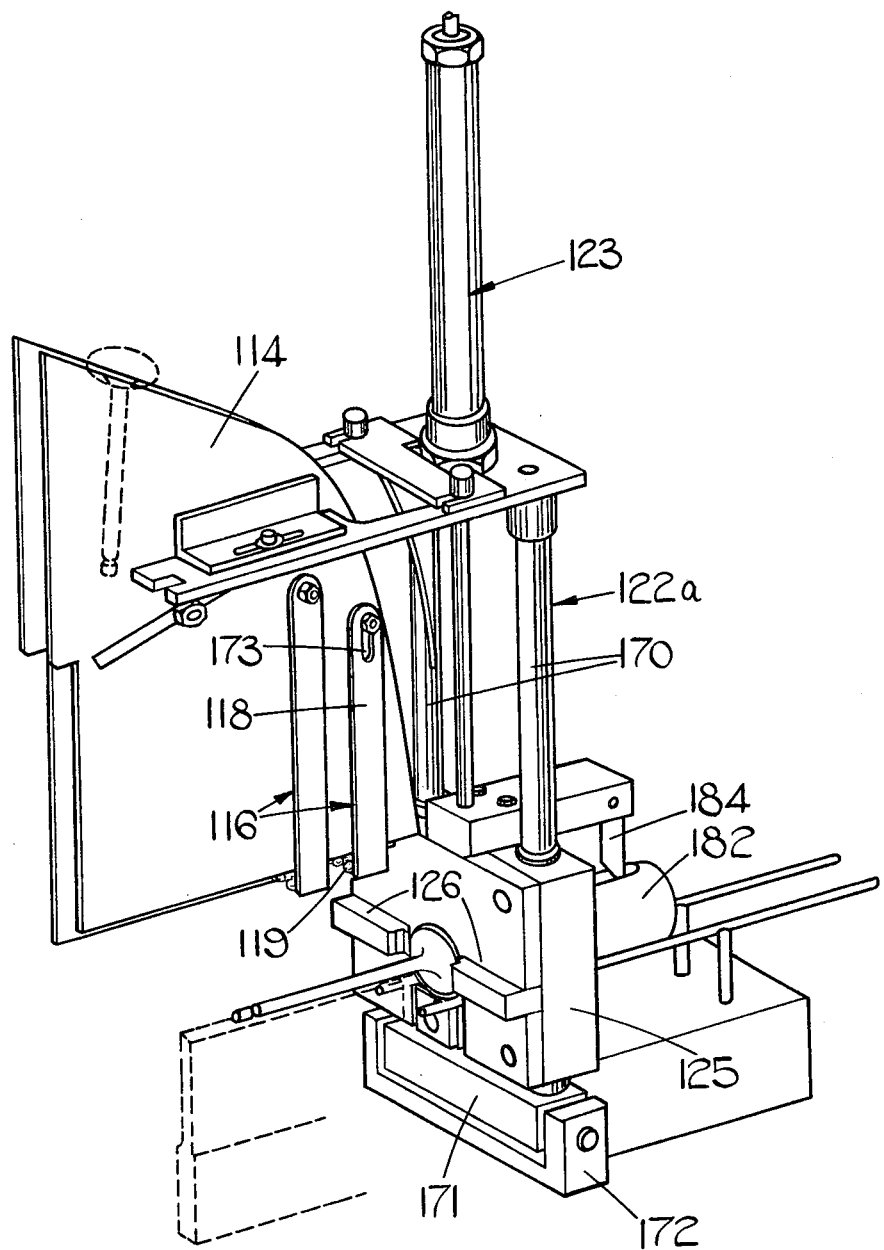
FIG. 8 is a perspective view of part of a centreless grinding machine incorporating a second embodiment of a feed mechanism according to the present invention.
Figure 9:
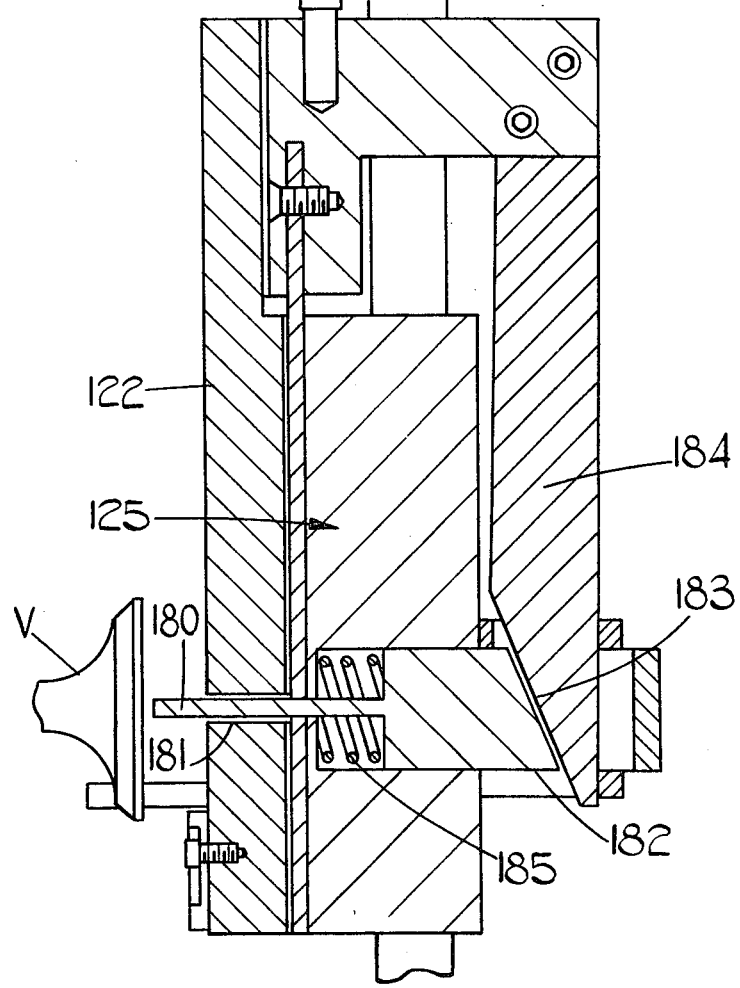
FIG. 9 is a sectional view corresponding to that of FIG. 6 of the mechanism of FIG. 8.

A second embodiment of a feed mechanism in a centreless grinding machine is illustrated in FIGS. 8 and 9, and is generally similar to the mechanism described above in relation to FIGS. 1 to 7. Accordingly, similar parts have been accorded the same reference numerals with 100 added. The feed mechanism of FIGS. 8 and 9 differs from that of FIGS. 1 to 7 in the following respects.

The guide 122a is in the form of a pair of spaced vertically disposed rods 170 which slidably pass through respective bores in the carriage 125. This arrangement provides rigidity, enables better lubrication to be effected, and eliminates interference of the sliding parts from dirt. The rods 170 are mounted at their bottom ends on a block 171 which is pivotally mounted on a fixed carrier 172. This enables the rods 170 and all of the parts attached thereto to be pivoted into a horizontal position to facilitate easier setting of the mechanism.

The jaws 126 are no longer adjustable, but are pre-set so as to receive valves whose heads fall within a predetermined size range. When valves whose heads fall outside this range are to be machined, a different set of pre-set jaws are substituted. In this way, the skill required to set up the mechanism for operation is reduced.

The arrester 116 situated closer to the feed mechanism 111 has vertically extending slots 173 in the upper ends of the spring arms 118 thereof, the arms 118 being secured to the quadrant plate members 114 by bolts passing through the slots 173. This arrangement enables the arrester 116, and more particularly the abutments 119 thereof, to be adjusted vertically so as to ensure that variously shaped workpieces will rest in a horizontal position when arrested by the arresters 116.

Referring to FIG. 9, the ejector mechanism now comprises an ejector pin 180 carried by the carriage 125 and movable in a direction perpendicular to the direction of movement of the drive member 122. The pin 180 extends through an aperture 181 in the carriage 125 so that an end thereof lies between the jaws 126 (not shown in FIG. 9). The pin 180 includes a portion 182 (see also FIG. 8) of increased diameter which has a recess therein having a chamfered side 183. A chamfered actuator member 184 is carried by the drive member 122, and is arranged to engage the chamfered side 183 when the drive member 122 moves relative to the carriage 125 as it approaches its lower extreme position. Such engagement causes the ejector pin 180 to move to the left as viewed in FIG. 9 against the action of a spring 185, the pin 180 thereby contacting the valve V and ejecting same from the clamp mechanism.

In the constructions described above, the arrangement of the drive member 22, 122 and the carriage 25, 125 lends a greater reliability to the feed mechanism as a whole, and also enables the number of individual components in the feed mechanism to be reduced. Therefore, maintenance requirements are reduced trouble-finding is made easier, and the feed mechanism is relatively cheap to produce. Moreover, the simplicity of the working parts and the compact design of the feed mechanism enables the mechanism to be fitted into the available area on the grinding machine.

Also, each of the feed mechanisms described above can be arranged to operate at any cycle time required of the grinding machine with the minimum of adjustment, and the arrangement used to clamp the workpiece during the feeding operation may be adjusted readily so as to accommodate different sizes of workpiece. Furthermore, because the workpiece is held mechanically during the feeding operation, greater control can be exercised over the workpiece. Thus should the compressed air supply to the piston and cylinder arrangement 23, 123 be interrupted, the workpiece will not be released from the feed mechanism and will not therefore be allowed to drop between the grinding and control wheels, an action which might otherwise cause damage to the grinding machine and the workpiece.

Previously, problems have occurred in handling an inherently inbalanced component, e.g. a valve, on grinding machines, especially where very quick grinding cycle times are involved.

The feed mechanism of the present invention in a centreless grinding machine represents an advance over previous designs of feed mechanisms, in which the workpiece to be machined is dropped or pushed onto the workpiece support blade of the grinding machine through a distance which may be as much as 1 in. to 5 in. In one particular example, the workpiece is fed onto a so-called "spoon" which then tips the workpiece onto the support blade.

This dropping or pushing action often causes the workpiece to rebound slightly from the support blade, with the consequent danger that the workpiece will catch the grinding wheel or wheels of the machine, resulting in the grinding away of small amounts of stock from the workpiece. Very often, this defect in the workpiece cannot be removed within the tolerances allowed for the grinding operation, and remains to a certain extend in the finished product.

In order to prevent the workpiece from catching the grinding wheel or wheels, it is necessary to separate the grinding control wheels by an amount which is greater than that which would be used if bouncing of the workpiece did not occur. This increases the grinding cycle time.

The mechanism of the present invention, on the other hand, provides a positive feed which does not involve dropping of the workpiece onto the support blade. The workpiece is instead placed on the support blade, and rebounding of the workpiece from the latter is substantially eliminated. This enables the grinding control wheels to be positioned closer together, thereby reducing the grinding cycle time. Moreover, the feed mechanism of the present invention only allows one workpiece at a time in the machining area, and ensures a high quality in the finished workpiece at optimum efficiency.

I claim:

1. A feed mechanism for feeding a workpiece from a first position to a second position, comprising a drive member reciprocatable between said first and second positions, a carriage engaged with said drive member and movable relative thereto, locking means for selectively locking said carriage to said drive member for movement therewith, a clamp assembly having movable jaws adapted to grip said workpiece, said clamp assembly being carried by said carriage, actuating means operative to open and close the jaws of said clamp assembly in accordance with relative movement between said drive member and said carriage, and releasing means for rendering said locking means inoperative when said drive member is adjacent said first and second positions respectively so as to permit relative movement between said drive member and said carriage and cause said actuating means to open or close said jaws, said releasing means including a positive stop with which said carriage is engagable when said drive member approaches said second position so that the workpiece is gripped by said clamp assembly at said first position and released by said clamp assembly at said second position while said drive member is moved in one and the same direction.

2. A feed mechanism as claimed in claim 1 wherein, said actuating means includes a cam and a cam follower arrangement carried by the drive member and the carriage, one of a cam surface and a cam follower of said arrangement being operatively connected to said clamp assembly such that relative movement between said drive member and said carriage in use causes said cam follower to move along said cam surface and thereby open or close said jaws of the clamp assembly.

3. A feed mechanism as claimed in claim 2 wherein, said clamp assembly is carried by said carriage, and said cam surface is provided on the drive member and said cam follower is carried by and operatively connected to one of the jaws of said clamp assembly.

4. A feed mechanism as claimed in claim 3, wherein said clamp assembly comprises a pair of opposed jaws which are movable towards and away from each other, and said cam and cam follower arrangement comprises a cam follower operatively connected to each said jaw and a respective cam surface engaged by each cam follower.

5. A feed mechanism as claimed in claim 1 wherein, an ejector mechanism is provided for ejecting said workpiece from said clamp assembly when said drive member reaches said second position.

6. A feed mechanism as claimed in claim 5, wherein the ejector mechanism includes an ejector member having a chamfered surface and an actuator member adapted to engage said chamfered surface as the drive member reaches said second position so as to move said ejector member to eject said workpiece from said clamp assembly in use.

7. A feed mechanism as claimed in claim 6 wherein the ejector member and the actuator member are carried by the drive member and the carriage, the ejector mechanism being actuated when relative movement occures between the drive member and the carriage at said second position.

8. A feed mechanism as claimed in claim 8 wherein the ejector member is pivotally mounted on one of the drive member and the carriage, engagement of the actuator member and the chamfered surface on the ejector member being arranged to cause the ejector member to pivot and thereby eject said workpiece from said clamp assembly.

9. A feed mechanism as claimed in claim 8 wherein the ejector member is pivotally mounted on the drive member, the chamfered surface is provided on an end of the ejector member, and the actuator member is carried by the carriage in a piston adjacent the jaws of the clamp assembly.

10. A feed mechanism as claimed in claim 6 wherein, the ejector member is slidably mounted on one of the drive member and the carriage so as to be movable in a direction perpendicular to the direction of movement of the drive member, engagement of the actuator member and the chamfered surface on the ejector member being arranged to cause the ejector member to move in said perpendicular direction and thereby eject said workpiece from said clamp assembly.

11. A feed mechanism as claimed in claim 5, wherein the ejector mechanism also includes at least one gas outlet orifice which is arranged to be directed towards said workpiece when the latter is in said second position, and supply means for selectively supplying gas to the or each outlet orifice when said drive member reaches said second position.

12. In a centreless grinding machine, a feed arrangement comprising a magazine for storing workpieces to be machined, a feed mechanism as claimed in claim 1, and means for supplying workpieces one by one from said magazine to said feed mechanism at said first position, a workpiece support member of said centreless grinding machine being positioned at said second position for receiving workpieces from said feed mechanism for machining.

* * * * *

UNITED STATES PATENT AND TRADEMARK OFFICE
CERTIFICATE OF CORRECTION

PATENT NO. : 4,094,107
DATED : June 13, 1978
INVENTOR(S) : FREDERICK HENRY NAUL

It is certified that error appears in the above-identified patent and that said Letters Patent are hereby corrected as shown below:

[54] "Centerless" should be --Centreless--;
Col. 1, line 4, "centerless" should be --centreless--;
Col. 3, line 46, "biassed" should be -biased--;
Col. 3, line 60, "buttom" should be --button--;
Col. 5, line 11, "gainst" should be --against--;
Col. 7, line 2, "extend" should be --extent--;
Col. 8, line 21, "occures" should be --occurs--;
Col. 8, line 22, "8" should be --7--.

Signed and Sealed this

Nineteenth Day of December 1978

[SEAL]

Attest:

RUTH C. MASON
Attesting Officer

DONALD W. BANNER
Commissioner of Patents and Trademarks